Nov. 19, 1968
R. T. CASEBOLT
3,411,255
FRAMELESS GLASS ENCLOSURE STRUCTURE
Filed Feb. 23, 1966
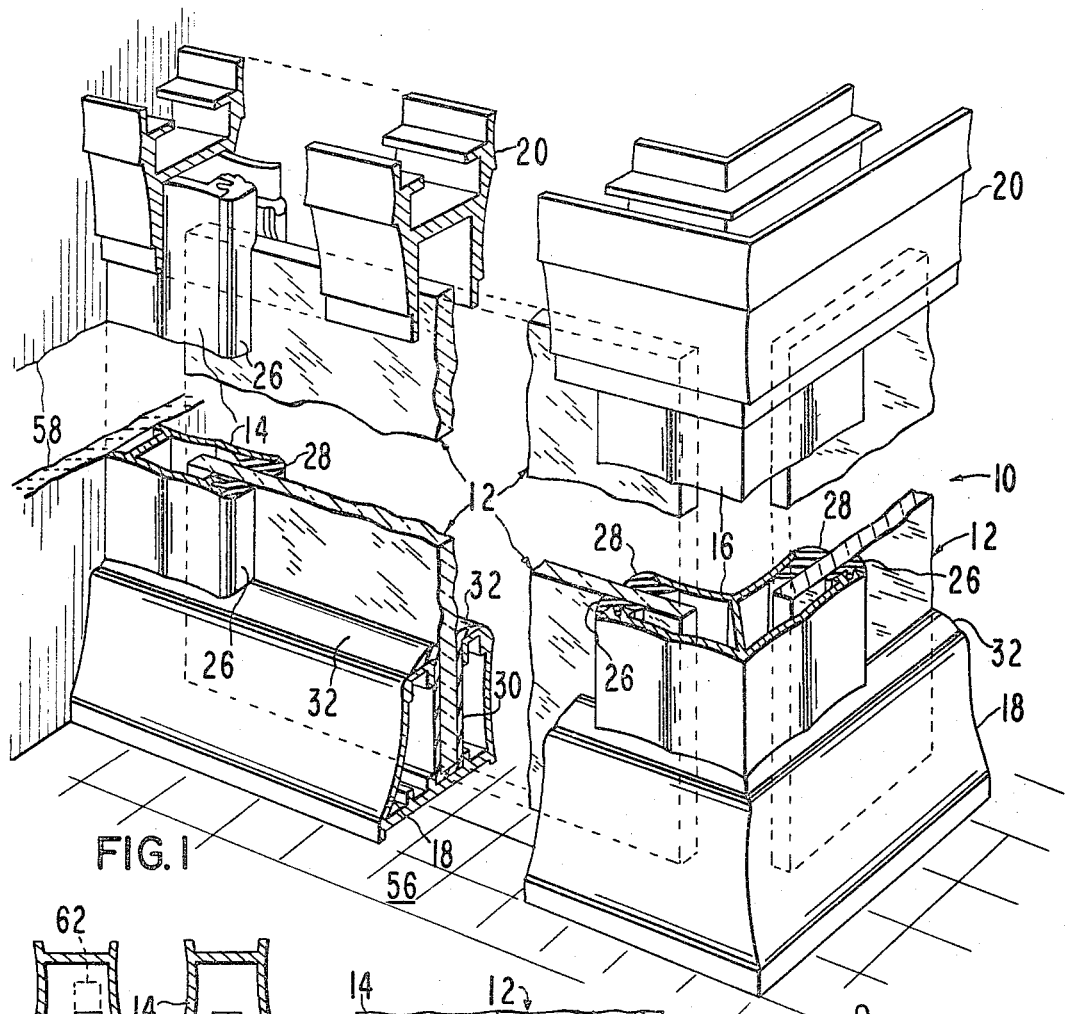
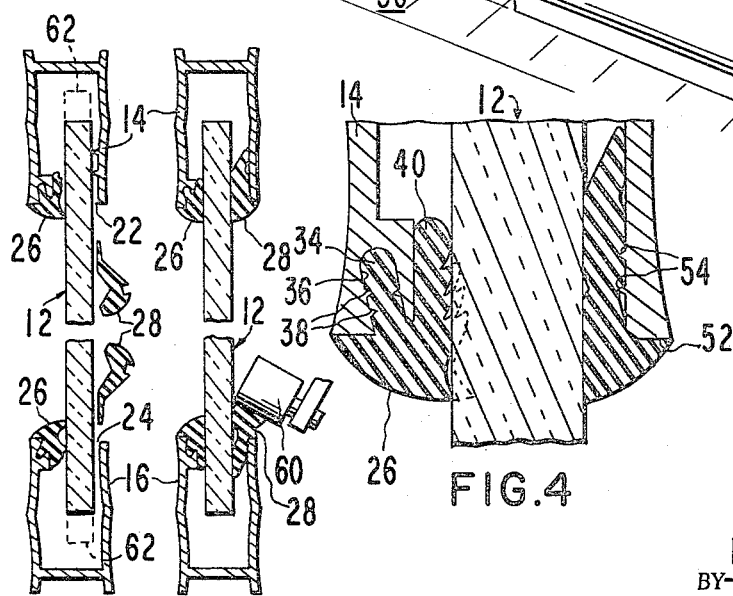
INVENTOR.
RALPH T. CASEBOLT
BY Townsend and Townsend
ATTORNEYS United States Patent Office 3,411,255
Patented Nov. 19, 1968

3,411,255
FRAMELESS GLASS ENCLOSURE STRUCTURE
Ralph T. Casebolt, 500 High St.,
Oakland, Calif. 94601
Filed Feb. 23, 1966, Ser. No. 529,413
2 Claims. (Cl. 52—397)

ABSTRACT OF THE DISCLOSURE

An improved wall construction utilizing a mounting unit having a number of interconnected, slotted members defining a central opening with the slots of the members communicating with the opening. A tempered glass panel is inserted in the opening with the outer margins of the panel inserted within the slots of the members. Panel gripping and sealing strips are received within the slots and engage opposite faces of the panels to maintain the latter in a generally fixed position relative to the mounting unit.

---

This invention relates to an enclosure formed of tempered glass panels, and more particularly, to a shower enclosure.

The present invention is directed to a shower enclosure using frameless panels of tempered glass and, in particular, sets forth apparatus and a method for mounting the panels so that not only are certain of the outer peripheries of the panels effectively sealed and maintained moisture-proof, but also the panels are held in place in positions providing optimum strength characteristics for the enclosure walls defined thereby. Moreover, the linear dimensions of the panels may differ from specified requirements and the panels can still be used without requiring a modification of the mounting structure as to size. To this end, the mounting unit is comprised of a number of generally stationary, tubular mounting members connected in end-to-end relationship. Each mounting member has an inner peripheral slot and the outer periphery of the panel is received within the mounting members through their slots. In addition, the panel is sealed and gripped by resilient sealing strips at the junctions of the panel and certain of the mounting members. The interior dimensions of the mounting members are such as to permit relative movement of the panels with respect thereto before the sealing strips are secured in place. This allows each panel to be shifted into a position with its outer periphery uniformly received in the mounting members, whereby the panel will be located to provide the aforesaid optimum strength characteristics.

Tempered glass is especially suitable for use in glass-type shower enclosures because of its relatively high impact strength and because tempered glass is relatively unstressed when hot water or steam impinges on one of its faces. Because of its strength, tempered glass can be handled, i.e., packaged and transported, without requiring elaborate safeguards to assure against breakage. This considerably simplifies its use as a shower wall component and, with the simplified structure of the above-mentioned mounting unit, it facilitates the installation and thereby minimizes the cost of a shower enclosure.

Once a glass panel is cut and thereafter tempered, it cannot further be trimmed so as to fit a space having predetermined dimensions. Hence, the panel must be precisely of the right size or provision must be made to compensate for variations of the panel linear dimensions from specified requirements due to cutting errors. The mounting unit of this invention provides for such errors even if the panel is slightly oversized as well as undersized.

It is therefore the primary object of this invention to provide improved wall structure for an enclosure and a method of installing the same wherein frameless panels of tempered glass may be utilized as wall components and the enclosure not only may be assembled in a minimum of time but also it will be simple and rugged in construction and will have an attractive appearance.

Another object of the invention is to provide a wall construction which compensates for small departures of the linear dimensions of a wall panel from specified requirements so that, notwithstanding such errors, the wall may be constructed with a minimum expenditure of time and effort on the part of a workman having no special skills in this field.

Still another object of the present invention is the provision of the wall structure whose component parts are few in number and commercially available and can be assembled at the job-site in a relatively short time without sacrificing the overall aesthetic qualities of the wall.

FIG. 1 is a fragmentary, perspective view of an enclosure utilizing the concepts of this invention, parts being broken away to illustrate details of construction;

FIGS. 2 and 3 are horizontal sections through a portion of the enclosure and illustrating certain of the steps of constructing the enclosure;

FIG. 4 is an enlarged, fragmentary, horizontal section of one wall of the enclosure showing the sealing and gripping means for holding a tempered glass panel in place; and FIG. 5 is a cross sectional view of a sealing strip used for sealing and gripping a tempered glass panel.

The structure of this invention, while hereinafter described with respect to a shower installation, is suitable for use in a number of different applications. Accordingly, the invention is limited only to the extent of the recitations of the claims appended hereto.

Enclosure 10, shown fragmentarily in FIG. 1, includes a number of frameless panels 12 of tempered glass disposed in generally upright positions by a mounting unit comprised of a number of interconnected channel members 14, 16, 18 and 20. Sealing structure to be described hereinafter in detail is provided to not only seal the junctions between panels 12 and the various channel members, but also to grip the panels to retain the same in positions providing optimum strength for the enclosure walls defined thereby.

Although enclosure 10 may have any number of sides and be of any height and width, for purposes of illustration, only two sides of the enclosure are illustrated in FIG. 1. A description of the structure of one of these sides suffices to illustrate the teachings of this invention and, when this is understood, it will be clear how the other sides of enclosure 10 may be constructed to complete the same.

All of the aforesaid channel members 14, 16, 18, and 20 have common features in that each is essentially tubular and has an inner peripheral slot for receiving a portion of the outer periphery of the corresponding panel 12. For example and as shown in FIG. 2, channel member 14 has a longitudinally extending slot 22 for receiving one side margin of its panel 12 and channel member 16 has a similar slot 24 for receiving the opposite side marginal edge of the same panel. Channel members 14 and 16, being transversely U-shaped, are spaced apart a distance such that the horizontal distance between their respective bights is greater than the horizontal distance between the side edges of panel 12. Also, the width of slots 22 and 24 is greater than the thickness of the panel. Thus, panel 12, after being inserted into channel members 14 and 16 and before it is gripped by the above-mentioned sealing structure, is free to move laterally to a limited extent, whereby the panel may be selectively positioned to dispose its outer periphery uniformly or to the same depth in channel members 14 and 16. This provides optimum strength for the wall defined by the panel. This feature also compensates for errors in the linear dimensions of panel 12 which arise when panel 12 is formed. Normally, the side marginal edges of panel 12 would be disposed adjacent to the bights of the channel members such as in the dashed line positions 62 (FIG. 2). However, if an error is made in cutting panel 12 so that its width is less than is desired, the panel may still be used so long as it is wide enough to extend into channel members 14 and 16 and to have sufficient surface to be gripped by the sealing structure hereinafter described.

In a similar manner, if the panel width is greater than is desired, ample space is allowed to compensate for the over-sized width. Since a tempered glass panel cannot effectively be cut, it cannot be trimmed as necessary to meet desired specifications. However, the mounting unit defined by the foregoing channel members compensates for errors in the width of panel 12.

In a similar manner, channel members 18 and 20 are disposed with respect to each other to permit compensation for errors in the length of panel 12. Channel member 18, since it forms the bottom portion of the mounting unit, will normally receive the bottom outer periphery of panel 12 to substantially its entire depth. In this way, the panel will be supported on edge on the bight of channel member 18. The upper portion of the panel outer periphery will extend into channel member 20 and, if necessary, a spacer may be provided between the lower peripheral edge of panel 12 and the bight of channel member 18 to assure that panel 12 extends into channel member 20.

The aforesaid sealing structure is provided at the inner peripheral slots of the various channel members and, in the case of channel members 14 and 16, includes a pair of longitudinally extending sealing strips 26 and 28 disposed for frictionally engaging respective faces of panel 12. A transversely U-shaped sealing member 30 is provided for channel member 18 as shown in FIG. 1, member 30 extending upwardly from the bight of channel member 18, through the inner peripheral slot thereof and then laterally in opposed directions to define a pair of longitudinally extending strips 32 which also frictionally engage respective faces of panel 12. The lower ends of strips 26 and 28 engage strips 32 and the upper ends terminate interiorly of channel member 20. To this end, channel member 20 effectively embraces the upper extremity of channel member 14 as is clear in FIG. 1. Panel 12 is disposed within sealing member 30 and the latter formed a cushioned base on which the lower end margin of the panel rests. No sealing means is deemed to be necessary between channel member 20 and panel 12 but such means could be provided if it is desired to render enclosure 10 substantially air-tight. Strips 26 and 28 and sealing members 30, by virtue of their frictional engagement with the panel faces, effectively grip panel 12 and thereby maintain the same in a fixed, operative position. Since the panel therefore cannot move normal to its faces, gripping structure is required on channel member 20 to prevent movement of panel 12 with respect thereto.

Strip 26 has a longitudinally extending portion 34 received within a groove 36 formed in one side of the corresponding channel member as shown in FIG. 4. Longitudinally extending ribs 38 project laterally into groove 36 and thereby into portion 34 to yieldably retain strip 26 in a fixed position. A second longitudinal portion 40 extends into the adjacent inner peripheral slot and is compressed by panel 12 when the opposing strip 28 is fitted into place.

Strip 28 has a transverse configuration of the type shown in FIG. 5 and includes a pair of angularly disposed sections 42 and 44, section 42 being relatively thin and section 44 being relatively thick. Angularity of sections 42 and 44 is provided by a substantially V-shaped groove 46 in strip 28 on one face thereof. A transversely U-shaped groove 48 on the opposite side of strip 28 defines a longitudinal surface 50, which, when strip 28 is inserted in place, engages the end face 52 of the corresponding channel member (FIG. 4) to limit the inward travel of strip 28 with respect to the channel member.

Section 42 of strip 28 is relatively thin to facilitate the insertion of strip 28 in the corresponding slot. The thick section 44 must be forcibly compressed in order to enter the slot. Hence, strip 28 will be deformed and will assume the configuration shown in FIG. 4 when it is in its operative disposition, whereby to provide an effective seal between the panel and the channel member. Laterally extending ribs 54 provide means for yieldably retaining strip 28 in place. To this end, one of the ribs may engage the surface of groove 48 opposed to surface 50 and thereby provide a stop to yieldably prevent movement of strip 28 out of the corresponding slot.

As shown in FIG. 2, strips 26 and 28 are interchangeable between channel members 14 and 16, thus considerably simplifying the wall structure. FIG. 2 also makes it clear that strips 26 are initially disposed in place before panel 12 is inserted into channel members 14 and 16 and before strips 28 are inserted in place.

Channel member 16 (FIG. 1) forms a corner portion of enclosure 10 and, for this reason, it defines the side portion of the mounting structure for a pair of panels 12. Nonetheless, it functions with respect to both panels in the manner described above. In this respect, channel member 16 may have an angular configuration so that adjacent panels 12 will be angularly disposed with respect to each other rather than mutually perpendicular as shown in FIG. 1. Channel member 16 in FIGS. 2 and 3 differs slightly from channel member 16 of FIG. 1, but this difference is of no consequence insofar as the teachings of the invention are concerned.

To illustrate the method of assembling enclosure 10, reference will again be had only to one side of the enclosure. Following this decription, one skilled in the art will understand how to assemble the other sides so as to complete the enclosure.

Initially, channel member 18 is positioned on a supporting surface 56 such as the floor on which the shower unit is to be placed. Any suitable means may be provided to secure channel member 18 in place. Channel member 14 is then secured to an adjacent wall 58 or other stationary structure so that member 14 will extended upwardly from one extremity of channel member 18. It will be assumed, of course, that sealing strips 26 and sealing member 30 will be mounted on channel members 18 and 14 respectively, prior to the insertion of the outer peripheral portions of panel 12 thereinto.

At this juncture, panel 12 may be inserted-into channel members 14 and 18, following which channel members 16 and 20 are mounted in place. In the alternative, channel member 16 may be mounted in place before panel 12 is inserted in place, in which case panel 12 is inserted into channel members 14 and 16 from the top and then is moved downwardly into channel member 18. Following this, channel member 20 is mounted in place. Any suitable fastening structure is then used to interconnect the extremities of the various channel members.

To insert each of the sealing strips 28 in place, force must be applied in order to compress each strip 28 into the limited space between the corresponding side of its channel member and the adjacent face of panel 12. Preferably, a rolling force is successively applied along the length of the strip in a manner shown in FIG. 3. For this purpose, a roller 60 is moved longitudinally of strip 28 and bears against the same to provide sufficient force to urge strip 28 into its disposition shown in FIG. 4. The frictional forces between strips 26 and 28 and panel 12 are sufficient to retain panel 12 in a fixed position with respect to the various channel members. Also, the sides of channel member 30 frictionally contribute to the gripping action of strips 26 and 28.

It will be clear that the remaining portions of enclosure 10 may be assembled in the same manner as the foregoing and that the assembly of enclosure 10 is considerably simplified by the various components which are not only simple and rugged in construction but which are few in number and can be interconnected with a minimum of skill and in a minimum of time.

Channel members 14, 16, 18 and 20 may be formed by well known extrusion techniques and of severable material, such as aluminum, so that their cost is kept to a minimum and they can be cut at the job site if necessary by tools which are ordinarily available. Transportation of the components to the job site presents no major problem because no elaborate packaging is necessary other than that required to prevent marring of the various surfaces of the components which provide the attractive appearance for enclosure 10.

What is claimed is:

1. In a walled enclosure: a mounting unit having a number of interconnected mounting members defining a central opening, each member having an inner peripheral slot communicating with the opening and with the slot of each member adjacent thereto; a tempered glass panel having a pair of opposed faces and an outer peripheral margin, said panel being disposed within the opening and having its peripheral margin received within the slots of said members, whereby the panel effectively closes said opening, said panel being shiftable relative to said members within said slots to permit the panel to be selectively positioned with respect to the members; a pair of sealing strips for each of at least certain of said members respectively, said strips being in engagement with respective faces of the panel and disposed to grip the latter therebetween to maintain the panel in a fixed position with respect to the members, at least one of said certain members having a groove adjacent to one side of the corresponding slot and extending longitudinally thereof, said groove having an entrance extremity adjacent to said central opening and being inclined relative to the corresponding slot, the strip corresponding to said one side of the slot of said one member having a tongue extending into said groove; and means in said groove for retaining said tongue therein, whereby the one strip can be initially positioned before the outer margin of the panel is moved into said slots, the other strip corresponding to said one member being resilient to permit it to be forced at least partially into the slot and against the opposite face of the panel, whereby the panel will be forcibly urged against the first mentioned strip.

2. In a walled enclosure as set forth in claim 1, wherein said retaining means includes a longitudinal rib extending into said groove, said tongue being resilient and disposed to be frictionally engaged by the rib.

References Cited

UNITED STATES PATENTS

| 2,918,708 | 12/1959 | Sharp | 52—397 X |
| 3,016,993 | 1/1962 | Owen | 52—397 |
| 3,140,763 | 7/1964 | Edelstein | 52—397 X |
| 203,820 | 5/1878 | Dyer | 52—499 |
| 3,023,859 | 3/1962 | Muessel | 52—397 |
| 3,062,339 | 11/1962 | Geyser | 52—498 |
| 3,226,897 | 1/1966 | Dorman | 52—397 X |

FOREIGN PATENTS 1,228,973    1959  France.

JOHN E. MURTAGH, *Primary Examiner.*